(Model.)

R. BAILE.
PIPE DAMPER.

No. 393,498. Patented Nov. 27, 1888.

Witnesses.
A. Ruppert.
W. Burris.

Inventor:
Robert Baile.
Per
Thomas P. Simpson,
Atty.

UNITED STATES PATENT OFFICE.

ROBERT BAILE, OF PHILADELPHIA, PENNSYLVANIA.

PIPE-DAMPER.

SPECIFICATION forming part of Letters Patent No. 393,498, dated November 27, 1888.

Application filed May 19, 1888. Serial No. 274,371. (Model.)

*To all whom it may concern:*

Be it known that I, ROBERT BAILE, a citizen of the United States, residing at Philadelphia, in the county of Philadelphia and State of Pennsylvania, have invented certain new and useful Improvements in Pipe-Dampers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a pipe-damper which may be stamped out of sheet metal, cost but little, and be very efficient.

Figure 1:
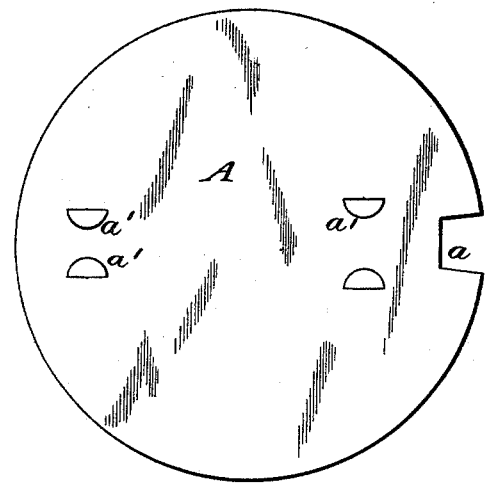
Figure 2:
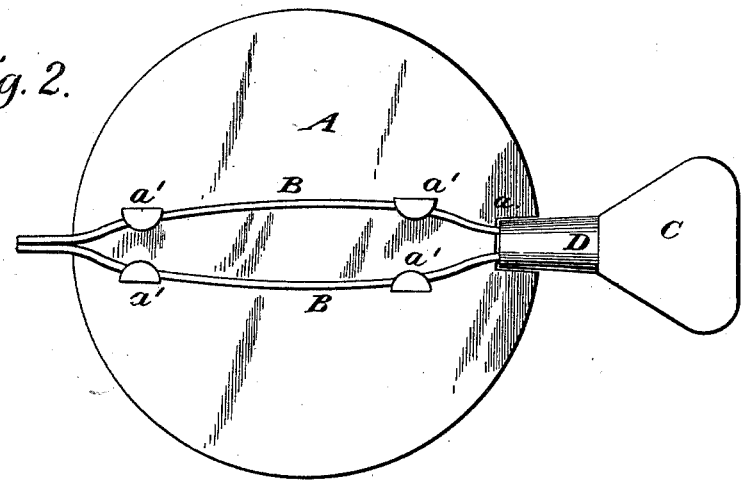
Figure 3:
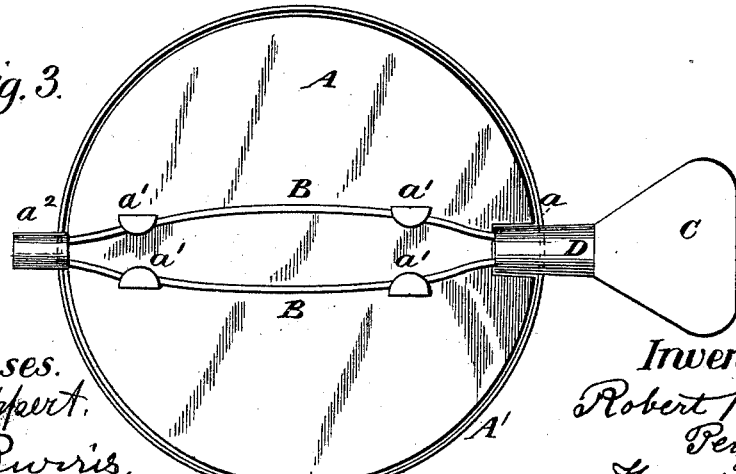

Figure 1 of the drawings is a plan view of a sheet-metal disk which has been stamped out of the metal at one blow and provided with the apertures and notch shown. Fig. 2 is a similar view of the disk with the handle and springs in place, and Fig. 3 is a similar view showing a ring on the outer end of the springs and a section of the pipe in which the damper works.

In the drawings, A represents the damper or disk, and A' the pipe in which it is journaled.

B B are two springs which tend to spring apart, and are fastened at one end in the tapering shank D of the thumb-piece C and held between the ears $a'$ $a'$ on the disk, so as to bring the outer ends, $b$ $b$, together. Thus the ends alone may serve as a journal; or I may use a separate tube, $a^2$, for that purpose, as shown in Fig. 3 of the drawings.

My damper is made at a very small expense, and yet is very efficient in practice.

What I claim as new, and desire to protect by Letters Patent, is—

The disk A, having the notch $a$ and ears $a'$, the springs B B, held between said ears, and the thumb piece C, having the tapering shank D passing into said notch, as shown, all combined and arranged as described.

In testimony whereof I affix my signature in presence of two witnesses.

ROBERT BAILE.

Witnesses:
CHAS. A. CARSON,
L. P. SIMPSON.